US007296826B2

(12) United States Patent
Hagen

(10) Patent No.: US 7,296,826 B2
(45) Date of Patent: Nov. 20, 2007

(54) COMPOSITE WINDOW LABEL CONSTRUCTION

(75) Inventor: Ronald G. Hagen, Larsen, WI (US)

(73) Assignee: WS Packaging Group, Inc., Algoma, WI (US)

( * ) Notice: Subject to any disclaimer, the term of this patent is extended or adjusted under 35 U.S.C. 154(b) by 715 days.

(21) Appl. No.: 10/479,920

(22) PCT Filed: Jun. 7, 2002

(86) PCT No.: PCT/US02/17903

§ 371 (c)(1),
(2), (4) Date: Dec. 5, 2003

(87) PCT Pub. No.: WO02/101694

PCT Pub. Date: Dec. 19, 2002

(65) Prior Publication Data

US 2004/0174012 A1 Sep. 9, 2004

Related U.S. Application Data

(60) Provisional application No. 60/297,379, filed on Jun. 11, 2001.

(51) Int. Cl.
*B32B 29/00* (2006.01)
*G09F 3/02* (2006.01)

(52) U.S. Cl. ............................ 283/81; 283/94; 283/91; 428/40.9; 428/42.1; 40/638

(58) Field of Classification Search .................. 283/72, 283/91, 81, 94, 101, 103, 105; 428/40.9, 428/41.1, 41.2, 42.1, 40.1, 913.3, 201, 202; 40/638

See application file for complete search history.

(56) References Cited

U.S. PATENT DOCUMENTS

| | | | | |
|---|---|---|---|---|
| 3,921,319 | A * | 11/1975 | Styers et al. | 40/654.01 |
| 5,127,675 | A | 7/1992 | Moss | |
| 5,873,607 | A | 2/1999 | Waggoner | |
| 6,092,843 | A | 7/2000 | Peterson et al. | |
| 2001/0025442 | A1 * | 10/2001 | Key | 40/638 |

FOREIGN PATENT DOCUMENTS

| | | |
|---|---|---|
| WO | 00/65560 | 11/2000 |

OTHER PUBLICATIONS

International Search Report, Form PCT/ISA/210, as issued by European Patent Office in Connection with PCT Application No. PCT/US02/17903.

* cited by examiner

*Primary Examiner*—Erica Cadugan
(74) *Attorney, Agent, or Firm*—Reinhart Boerner Van Deuren s.c.

(57) ABSTRACT

A composite window label construction has a base pressure-sensitive, adhesive-backed label with a window (14) cut out of it and a second layer of reflective material covering the window (14) from the back side of the base layer (16) and adhered to the back side of the base layer around margins of the second layer. In a method of making the label construction, a continuous release liner is stipped from the base material web after the windows are cut in the base material web and individual swatches of the second layer are cut from a continuous roll of the second layer and individually placed over the windows. Subsequently, the same or a different release liner is reattached to the pressure-sensitive adhesive side of the base web and individual labels are cut from the base web.

20 Claims, 2 Drawing Sheets

COMPOSITE WINDOW LABEL CONSTRUCTION

CROSS REFERENCE TO RELATED APPLICATIONS

This claims the benefit of U.S. Provisional Patent Application No. 60/297,379 filed Jun. 11, 2001.

STATEMENT REGARDING FEDERALLY SPONSORED RESEARCH OR DEVELOPMENT

Not applicable.

FIELD OF THE INVENTION

This invention relates to labels and methods of making labels.

BACKGROUND OF THE INVENTION

Grocery store and other retail customers are known to make their purchasing decisions in three to seven seconds among different brands of the same product. An important attention-grabbing feature of the product is its labeling. Therefore, it is desirable for a manufacturer competing against manufacturers of the same general product to label their products in such a way as to attract the attention of the consumer.

It is known in labels to use techniques such as hot melt stamping to provide a reflective film to all or parts of a product label. In that type of a process, a web of metallic film is die cut and laminated onto the top surface of a base layer to produce the metallic or reflective portions on the label. For example, the features of a design or certain letters of a word may be die cut out of the metallized film and laminated to the top of the base sheet.

This process is relatively wasteful of metallic film material and also is so common that its attention-getting value is diluted. In addition, because the hot stamp graphics become flush with the top surface of the label, there is no depth or three-dimensional aspect to the label.

SUMMARY OF THE INVENTION

The present invention provides a label and method of constructing it in which a base label has a window die cut out of it in a particular shape and another layer of material is laminated to the back of the base layer over the cut-out window opening. The other material is preferably a metallic film so as to present a highly reflective, attention-getting surface in the area of the window. Since the other material laminated over the cut out is not flush with the top surface of the label, a sense of depth is given to the label as well.

In a preferred method of making labels of the invention, a swatch of the other material which is used to cover the window is adhered to the back side of the base label adjacent to the periphery of the window. The base label is larger than the swatch on all sides of the swatch so as to fully encapsulate the swatch between the base label and the product to which the base label is adhered, all the way around the swatch.

In another preferred aspect, the base label has a pressure sensitive adhesive covering its rear surface, and the pressure-sensitive adhesive of the base label laminates the swatch to the base label.

In a further desirable aspect, the base label stock, provided in roll form, with a continuous pressure-sensitive adhesive-backed base label carried on a continuous release liner has windows cut out in line and swatches applied over the windows, also in line. This is accomplished by separating the base label web from the release liner and placing individual swatches in registration over the previously cut out windows on the back of the base label web. After placing of the swatches, the same release liner or a different release liner is reapplied to the back of the base label web.

Preferably before, but possibly after, the cutting of the windows and placing of the swatches, the base label web can be printed with other graphics for the labels, and after placing of the swatches and reapplication of a release liner to the base web, individual labels are cut out from the base web and the waste matrix is removed.

The above described objects and advantages, and other objects and advantages, of the invention will be apparent from the following detailed description and from the drawings.

DETAILED DESCRIPTION OF THE PREFERRED EMBODIMENT

Figure 1:
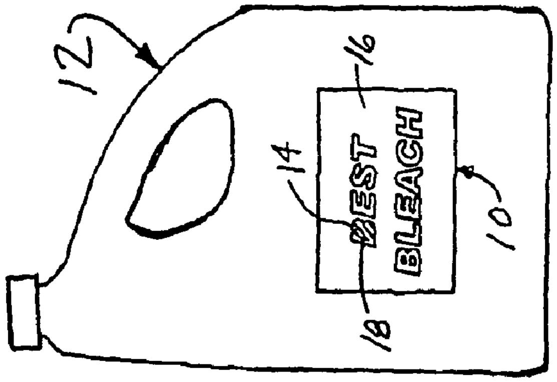
FIG. 1 is front plan view of a typical product incorporating a label of the invention.
Figure 2:
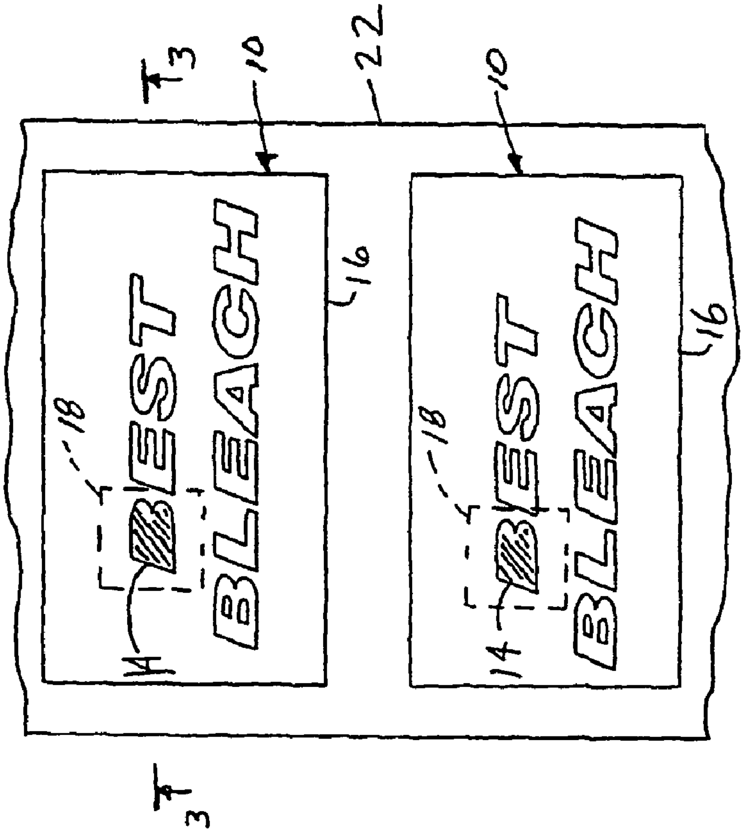
FIG. 2 is a top plan view of two labels of the present invention shown being carried on a release liner.
Figure 3:
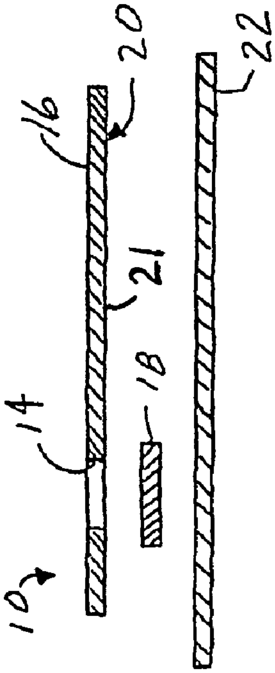
FIG. 3 is a cross-sectional view from the plane of the line 3-3 of FIG. 2.

Referring to FIGS. 1-3, in FIG. 1 a label 10 of the invention is shown mounted on a bottle 12 of product. The label 10 is a relatively simple label, for purposes of illustration, bearing the words "BEST BLEACH". The letters "EST BLEACH" are simply printed letters as are normal on labels of this type, printed on top layer 16, which may be paper, plastic or foil. However, the letter "B" in the word "BEST" is made by cutting out the outline of the "B" so as to form cut out window opening 14 in sheet material layer 16, and adhering to the back of layer 16 a second layer 18 of sheet material.

The layer 18 is adhered to the back side of the layer 16 around the perimeter of the window 14. This can be accomplished with a separate adhesive which is pattern printed onto the swatch 18 or onto the back side of the layer 16, but is preferably accomplished by adhering the swatch 18 to the back side of the layer 16 by pressure-sensitive adhesive which is normally provided on and covers the entire area of the back side 20 of the layer 16. Also as is normal, a silicone release liner 22 is normally provided adhered to the pressure-sensitive adhesive on the back side 20 in strip form. When the label 10 is applied from the liner 22 to the product 12, the pressure sensitive adhesive on its back side, in the attachment area 21 which extends outwardly from the swatch 18 and is not covered by the swatch 18, adheres the label 13 to the product 12, at all areas of the label except where the swatch 18 is located.

Preferably, the sheet material 18 is a metallic or other highly reflective film or foil material.

Since the top surface of the sheet 18 is adhered to the bottom surface of the sheet 16, the edges of the window 14 remain exposed and the sheet 18 is actually behind the sheet 16. As such, the top surface of the sheet 18 is flush with the rear surface of the sheet 16 and is below the top surface of the sheet 16. This gives a depth effect to the label, particularly when a reflective surface is provided on the front surface of the layer 18, which is visible through the window 14.

Figure 4:
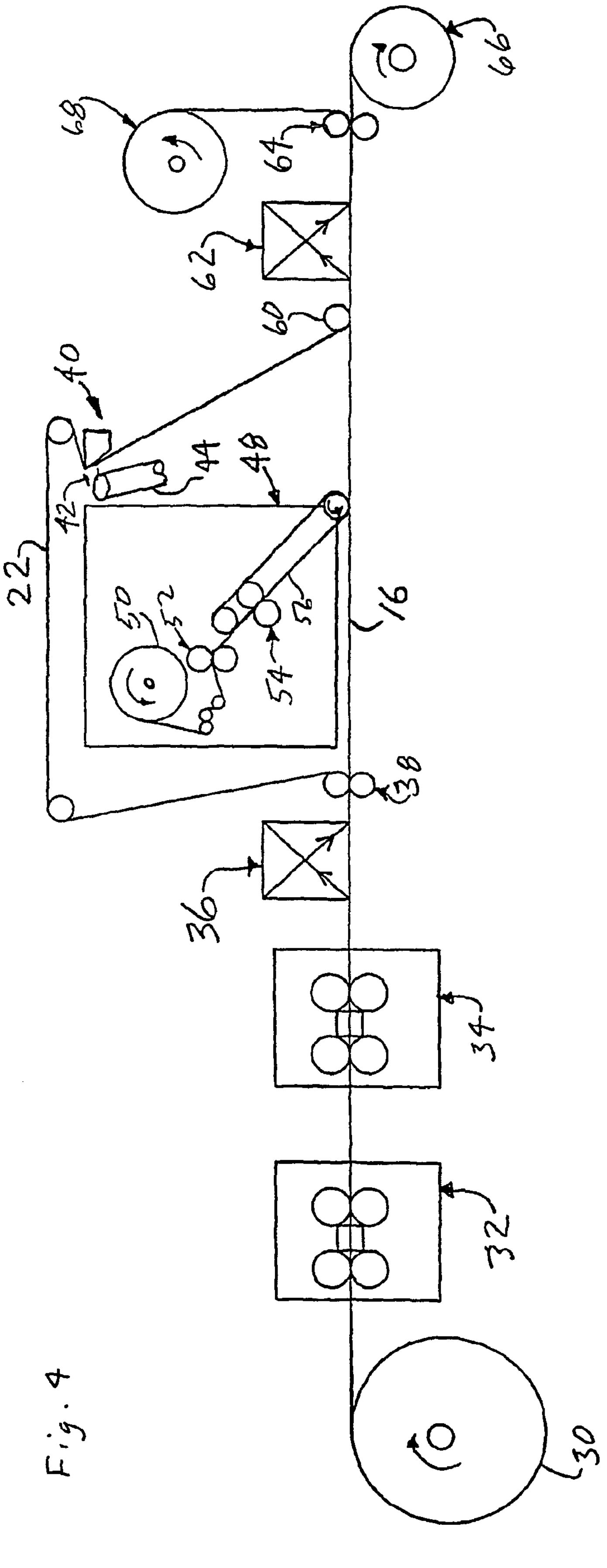
FIG. 4 is a schematic view of a label production line for making labels of the invention.

Referring to FIG. 4, a manufacturing process for making labels of the invention is schematically depicted. A roll 30 of pressure-sensitive base sheet material, which may be paper or metal or plastic film, is provided. This is ordinary, commercially available, self-adhesive release liner backed material. Two printing stations 32 and 34 are illustrated although any number could be provided, including none. These printing stations are provided to print lettering on the labels, such as the "EST BLEACH" on the labels of FIGS. 1 and 2. A turn bar station 36, also well-known in the art, is provided to turn the web of base sheet material over, so that the material entering the turn bar 36 with the base sheet material facing upward will exit the turn bar 36 with the base sheet material facing downward. After the turn bar 36, the base sheet material enters the nip between cutting and stripping rollers 38 which die cut the windows 14. The release liner material 22, with the cut out "holes" 42 adhered to it, is stripped off of the base sheet material 16 at station 38. The continuous base sheet material 16 continues in a straight line with its self-adhesive surface facing upwardly.

From station 38, the release liner 22 which is stripped from the continuous sheet 16 is fed to a stripping station 40 at which the "holes" 42 are stripped off and vacuumed up by a vacuum system pipe 44. The base label web 16 is directed to an applicator 48 which unrolls material for making the swatches 18 from a roll 50. If necessary, for example if pressure-sensitive base stock was not used, a glue applying station 52 could apply glue to the areas of the material 50 which become the swatches 18 in a pattern around the border. However, with the use of pressure-sensitive backed stock, the glue is typically not required to be applied by station 52 so this station normally goes unused.

The web 50 is next fed to a cutting station 54 at which lengths of the web 50 are cut off so as to create the individual rectangular swatches 18, shown in hidden lines in FIG. 2. The individual swatches 18 are then placed on a vacuum belt 56, or alternatively a vacuum roller, to be placed over the windows 14 which are cut into the continuous web 16. Registration between the applicator 48 and the moving web 16 may be provided by any suitable means, such as a printed timing mark or by sensing the windows 14 themselves with an appropriate light or other sensor. Any suitable timing method may be used.

Roller 60 brings the continuous base label 16 and the continuous release liner 22 back together, and turn bar 62 places the composite web back in the orientation with the base web 16 facing upward. Die cutting and stripping rollers 64 die cut the web 16 into individual labels, as shown in FIG. 2. The continuous release liner 22 with the individual labels mounted on it is rolled up into roll 66 and the waste matrix consisting of the matrix of material cut out from the labels at the margins and in-between the labels 10 is rolled up on roll 68.

Thereby, labels of the invention, including a window having exposed interior edges and covered on the back side by a second layer of material, is produced. Preferably, the second layer is sandwiched between the base label material and the release liner until the individual labels are delaminated from the release liner to be placed on product packages by the manufacturer of the products.

It is noted that FIG. 3 is not a "to scale" representation of the thicknesses of the label layers. Typically, the layer 18 would be a film or foil, which is significantly thinner than the layer 16.

An alternate to the production line shown in FIG. 4 would be to simply remove the release liner 22 from the continuous base label web 16, strip off the "holes", and roll up the base liner material for later use. If that were done, then a separate roll of release liner material would be reapplied to the adhesive surface of the continuous base label web 16 at the roller station 60.

Applicators such as the applicator 48 are well-known and commercially available. For example, such applicators are commercially available from Tamarack of Waconda, Ill. 60084 and sold under the tradename "Vista" Patch Application System.

A preferred embodiment of the invention has been described in considerable detail. Many modifications and variations to the preferred embodiment described will be apparent to those skilled in the art. For example, at the cutting and stripping station 38, the cut of the window 14 could extend all the way through the base label layer 16 and also through the release liner 22 and the waste two-layer "holes" vacuumed out or otherwise disposed of at that location. Therefore, the invention should not be limited to the preferred embodiments described, but should be defined by the claims which follow.

I claim:

1. A composite window label construction, comprising:

a first layer of sheet material having a front surface and a back surface, said front surface of said first layer of sheet material having advertising indicia printed thereupon, said back surface of said first layer of sheet material being covered with an adhesive layer;

at least one window from which the material of said first layer of sheet material has been removed, said at least one window having a predefined configuration, said at least one window being surrounded by material of said first layer of sheet material and the cut edges of said window being exposed;

a second layer of reflective sheet material having a front surface and a back surface, said front surface of said second laver of reflective material being mounted onto said back surface of said first layer of sheet material so as to be located under said window and sized to completely cover and overlap said window on all sides thereof, the overlap defining on said second layer of sheet material a first peripheral area that is located outside of the area of said second layer of reflective sheet material covering said window, said first peripheral area being adhered to said back side surface of said first layer of sheet material at a second peripheral area on the back side surface of said first layer which surrounds said window; and a release liner, the area of said back surface of said first layer of sheet material that is not covered by said second layer of reflective sheet material being removably adhesively secured to said release liner, said first peripheral area of said second layer of reflective sheet material being sandwiched between said second peripheral area of said first layer of sheet material and said release liner.

2. A composite window label construction as defined in claim 1, wherein said adhesive laver on said first layer of material has comprises a pressure-sensitive adhesive.

3. A composite window label construction as defined in claim 2, wherein said second layer of material is adhered to said first layer of material by said pressure-sensitive adhesive provided on said back surface of said first layer.

4. A composite window label construction as defined in claim 2, wherein said release liner is adhered to said back surface of said first layer by said pressure-sensitive adhesive.

5. A composite window label construction as defined in claim 1, wherein said release liner comprises a continuous strip upon which a plurality of said first and second layers of sheet material are removably mounted.

6. A composite window label construction as defined in claim 1, wherein a portion of said front surface of said second layer of reflective material is visible through said window.

7. A composite window label construction as defined in claim 1, wherein said first peripheral area of said front surface of said second layer is adhered to said second peripheral area of said back surface of said first layer by a printed pattern adhesive on said first peripheral area of said front surface of said second layer.

8. A composite window label construction as defined in claim 1, wherein said first peripheral area of said front surface of said second layer is adhered to said second peripheral area of said back surface of said first layer by a printed pattern adhesive on said second peripheral area of said back surface of said first layer.

9. A composite window label construction as defined in claim 1, wherein a third peripheral area on the back surface of said first layer is located between the outer periphery of said first layer of sheet material and said second peripheral area on the back surface of said first layer which surrounds said window, said third peripheral area on the back surface of said first layer entirely surrounding said second peripheral area on the back surface of said first layer.

10. A composite window label construction as defined in claim 1, wherein said second layer of reflective sheet material comprises a metallic material.

11. A composite window label construction as defined in claim 1, wherein said second layer of reflective sheet material comprises a film material.

12. A composite window label construction as defined in claim 1, wherein said second layer of reflective sheet material comprises a film material.

13. A composite window label construction as defined in claim 1, wherein said release liner comprises a silicon release liner.

14. A composite window label construction as defined in claim 1, wherein said cut edges of said window provide depth to said predefined configuration.

15. A composite window label construction as defined in claim 1, wherein said advertising indicia located on said front surface of said first layer of sheet material and the portion of the second layer of sheet material visible through said window collectively comprise a unitary advertising indicia.

16. A composite window label construction as defined in claim 1, wherein said second layer is much thinner than said first layer so that said front surface of said peripheral area of said first layer, where said first layer and said second layer overlap, appears uniformly flat with the entire said front surface of said first layer.

17. A composite window label construction, comprising:

a first layer of sheet material having a front surface and a back surface, said front surface of said first layer of sheet material having advertising indicia located thereupon;

a first window located in said first layer of sheet material from which the material of said first layer of sheet material has been removed, said first window having a predefined configuration and being surrounded by material of said first layer of sheet material;

an adhesive layer covering said back surface of said first layer of sheet material;

a second layer of sheet material having a reflective front surface and a back surface, said reflective front surface of said second layer of reflective material being mounted onto said back surface of said first layer of sheet material to completely cover said window, said second layer of sheet material overlapping said window on all sides of said window, the overlap defining in said second layer of sheet material a first peripheral area that completely surrounds the portion of said second layer of sheet material that covers said window, said first peripheral area of said second layer of sheet material being secured to said adhesive layer on said back surface of said first layer of sheet material at a second peripheral area on the back surface of said first layer which surrounds said window, said first and second layers of sheet material and said adhesive layer collectively comprising a label; and a release liner upon which said label is removably mounted.

18. A composite window label construction as defined in claim 17, wherein a third peripheral area on the back surface of said first layer is located between the outer periphery of said first layer of sheet material and said second peripheral area on the back surface of said first layer which surrounds said window, said third peripheral area on the back surface of said first layer entirely surrounding said second peripheral area on the back surface of said first layer.

19. A composite window label construction as defined in claim 17, wherein said advertising indicia located on said front surface of said first layer of sheet material and the portion of said reflective front surface of said second layer of sheet material visible through said window collectively comprise a unitary advertising indicia.

20. A composite window label construction, comprising:

a first layer of sheet material having a front surface and a back surface, said back surface being covered with an adhesive layer;

at least one window of material cut out of said first layer in a predefined configuration;

a second layer of sheet material having a front surface and a back surface, said front surface of said second layer being positioned on said back surface of said first layer to cover said window, said second layer of material having a first peripheral area outside of the area covering said window, said front surface of said second layer being adhered to said back surface of said first layer at a second peripheral area on the back surface of said first layer that surrounds said window; and a release liner, wherein the area of said back surface of said first layer not covered by said second layer is removably adhered to said release liner, and wherein the release liner also covers the back surface of the second layer.

* * * * *

UNITED STATES PATENT AND TRADEMARK OFFICE

CERTIFICATE OF CORRECTION

PATENT NO. : 7,296,826 B2
APPLICATION NO. : 10/479920
DATED : November 20, 2007
INVENTOR(S) : Ronald G. Hagen It is certified that error appears in the above-identified patent and that said Letters Patent is hereby corrected as shown below:

Col. 5, Line 39: “comprises a film material.” should be --comprises a foil material.--

Signed and Sealed this

Twenty Second Day of April, 2008

JON W. DUDAS
*Director of the United States Patent and Trademark Office*